United States Patent
Palgy et al.

(10) Patent No.: US 11,917,529 B2
(45) Date of Patent: Feb. 27, 2024

(54) SYSTEMS AND METHODS FOR IDENTIFYING FALSE ALARMS FROM GHOST CELLS ARRIVING FROM LTE-SSS DETECTION WITH HALF-FRAME COMBINING

(71) Applicant: Sequans Communications SA, Colombes (FR)

(72) Inventors: Michal Palgy, Rosh Haayin (IL); Raphael Veyre, Paris (FR); Roy Ron, Tel Aviv (IL)

(73) Assignee: SEQUANS COMMUNICATIONS SA, Colombes (FR)

( * ) Notice: Subject to any disclaimer, the term of this patent is extended or adjusted under 35 U.S.C. 154(b) by 308 days.

(21) Appl. No.: 17/472,092

(22) Filed: Sep. 10, 2021

(65) Prior Publication Data
US 2023/0109423 A1    Apr. 6, 2023

Related U.S. Application Data

(63) Continuation of application No. PCT/CN2018/111511, filed on Oct. 23, 2018.

(51) Int. Cl.
*H04W 4/00* (2018.01)
*H04W 48/16* (2009.01)
*H04W 56/00* (2009.01)

(52) U.S. Cl.
CPC ............ *H04W 48/16* (2013.01); *H04W 56/00* (2013.01)

(58) Field of Classification Search
CPC .................................................... H04W 48/16
USPC ........................................................ 370/328
See application file for complete search history.

(56) References Cited

U.S. PATENT DOCUMENTS

| 11,777,648 | B2* | 10/2023 | Pan ...................... H04J 11/0076 370/254 |
| 2017/0295551 | A1* | 10/2017 | Sadiq ................... H04L 27/2613 |
| 2017/0373812 | A1* | 12/2017 | Berggren .............. H04L 5/0053 |

* cited by examiner

*Primary Examiner* — Temica M Beamer
(74) *Attorney, Agent, or Firm* — One LLP

(57) ABSTRACT

Disclosed are example embodiments of cell detection in a mobile communications network. An example method includes performing a detection procedure in the mobile communications network, the detection procedure including correlating two M-sequences to generate two correlations, and combining the two correlations, each correlation expressed as a likelihood of a cyclic shift, combining the two correlations to form a likelihood of a SSS sequence; and performing a signature-based filtering to eliminate a cell detection false alarm peak, the signature-based filtering including comparing a known signature of a specific secondary synchronization signal SSS sequence going through the detection procedure.

20 Claims, 16 Drawing Sheets

800 perform a detection procedure in the mobile communications network, the detection procedure including correlating two M-sequences to generate two correlations, and combining the two correlations, each correlation expressed as a likelihood of a cyclic shift, combining the two correlations to form a likelihood of a SSS sequence

802 hypothesis testing a scrambling sequence of a second M-sequence of the two M-sequences to combine the two correlations in each of the half-frames.

804 perform a signature-based filtering to eliminate a cell detection false alarm peak, the signature-based filtering including comparing a known signature of a specific SSS sequence going through the detection procedure.

806

FIG. 8

SYSTEMS AND METHODS FOR IDENTIFYING FALSE ALARMS FROM GHOST CELLS ARRIVING FROM LTE-SSS DETECTION WITH HALF-FRAME COMBINING

TECHNICAL FIELD

The disclosure relates generally to the field of wireless communication, specifically and not by way of limitation, some embodiments are related to improving cell search operations by a User Equipment (UE) in a Long-Term Evolution (LTE), Fifth Generation (5G), or other cellular communication network.

BACKGROUND

UEs in an LTE, 5G, or other cellular communications network may perform cell searching. Cell searching is when a UE attempts to detect and identify any base stations within range of the UE. A base station may be considered within the range of the UE when the downlink signals of the base station are currently being received by the UE. The cell searching may allow the UE to synchronize with an LTE downlink signal in both time and frequency.

When cell searching, the UE relies upon certain signals to detect, identify, and initially synchronize with one or more base stations. For example, the UL may first detect a primary synchronization signal (PSS), which may then be used for a rough timing synchronization (e.g., 5 ms). The rough timing synchronization using the PSS may allow the UE to detect a secondary synchronization signal (SSS). The SSS may provide a physical layer cell identity and allow the UE to synchronize with a frame. Since all the frames in a network may have the same timing, all the nearby cells may have the same synchronization (not including path delay considerations).

In some instances, cell searches may result in false alarms. A false alarm is when a non-existent cell (e.g., a "ghost cell") is detected. Ghost cells may be detected due to random noise and interference or imperfect PSS/SSS cross-correlation properties between two different cell IDs. The ghost cells (non-existent cells) may be detected among valid candidate cells. Accordingly, false alarms may cause inaccurate cell search results because the cell search results may include the non-existent or ghost cells in addition to the valid candidate cells. Thus, false alarms may impair UE performance because the UE may treat a non-existent cell (e.g., a "ghost cell") as if the non-existent cell is a valid candidate cell.

SUMMARY

Disclosed are systems and methods for cell detection in a mobile communications network. The systems and methods described herein may use signature-based filtering to eliminate a cell detection false alarm peak. The "ghost cells" filtering approach may use the knowledge of the signature that a specific SSS sequence has while going through the detection procedure to remove False-Alarm (FA) peaks potentially.

One general aspect includes a method for cell detection in a mobile communications network. The method also includes performing a detection procedure in the mobile communications network. The detection procedure may include correlating two M-sequences to generate two correlations and combining the two correlations. Each correlation may be expressed as a likelihood of a M-sequence's cyclic shift. Each of the two correlations may be combined to form a likelihood of a SSS sequence (or equivalently a cell ID). In an example embodiment, a cell-ID may be derived from N2-ID (PSS sequence) and N1-ID (SSS sequence). The signature-based filtering may include comparing a known signature of a specific secondary synchronization signal SSS sequence going through the detection procedure.

One general aspect includes an apparatus for wireless communication. The apparatus also includes a memory and at least one processor coupled to the memory and configured to: perform a detection procedure in the mobile communications network, the detection procedure including correlating two M-sequences to generate two correlations and combine the two correlations, each correlation expressed as a likelihood of a cyclic shift, combining the two correlations to form a likelihood of a SSS sequence. The processor may perform a signature-based filtering to eliminate a cell detection false alarm peak, the signature-based filtering including comparing a known signature of a specific SSS sequence going through the detection procedure.

One general aspect includes a non-transitory computer-readable medium storing computer-executable code for wireless communication. The non-transitory computer-readable medium storing computer-executable code also includes code for performing a detection procedure in the mobile communications network, the detection procedure including correlating two M-sequences to generate two correlations, and combining the two correlations, each correlation expressed as a likelihood of a cyclic shift, combining the two correlations to form a likelihood of a SSS sequence and perform a signature-based filtering to eliminate a cell detection false alarm peak, the signature-based filtering including comparing a known signature of a specific SSS sequence going through the detection procedure.

The features and advantages described in the specification are not all-inclusive. In particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the disclosed subject matter.

BRIEF DESCRIPTION OF THE DRAWINGS

The foregoing summary, as well as the following detailed description, is better understood when read in conjunction with the accompanying drawings. The accompanying drawings, which are incorporated herein and form part of the specification, illustrate a plurality of embodiments and, together with the description, further serve to explain the principles involved and to enable a person skilled in the relevant art(s) to make and use the disclosed technologies.

FIG. 8 is a flow diagram illustrating an example method in accordance with the systems and methods described herein.

Figure 1:
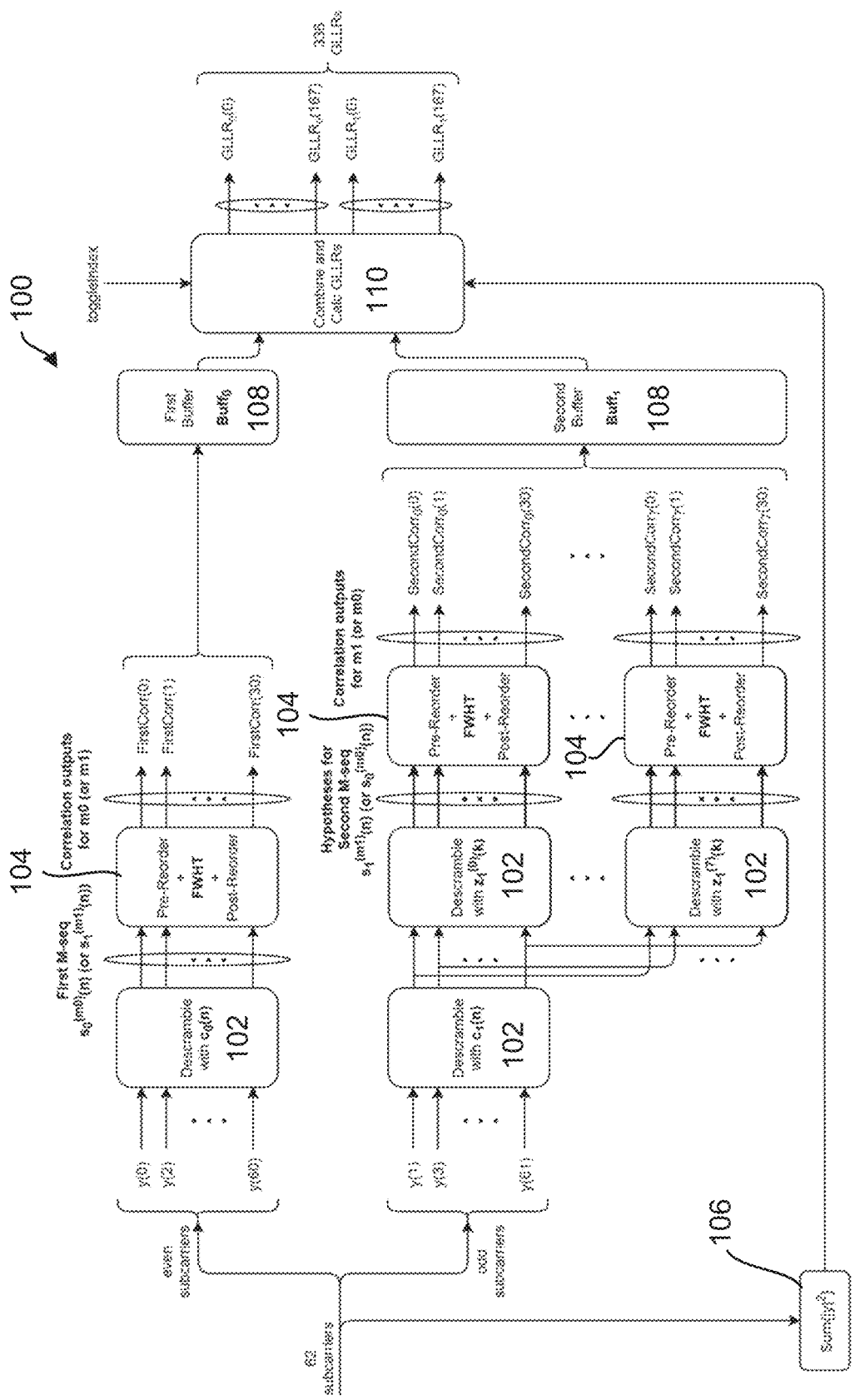
FIG. 1 is a diagram illustrating joint maximum likelihood (ML) detection with half-frame combining.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

DETAILED DESCRIPTION

The detailed description set forth below in connection with the appended drawings is intended as a description of configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an, electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In LTE a physical downlink control channel (PDCCH) may carry downlink control information (DCI) within one or more control channel elements (CCEs), each CCE including nine RE groups (REGs), each REG including four consecutive REs in an orthogonal frequency-division multiplexing (OFDM) symbol. A primary synchronization signal (PSS) may be used by a UE to determine subframe/symbol timing and a physical layer identity. A secondary synchronization signal (SSS) may be used by a UE to determine a physical layer cell identity group number and radio frame timing. Based on the physical layer identity and the physical layer cell identity group number, the UE can determine a physical cell identifier (PCI). The physical broadcast channel (PBCH) carries a master information block (MIB). The MIB provides a number of RBs in the system bandwidth, and a system frame number (SFN). The physical downlink shared channel (PDSCH) carries user data, broadcast system information not transmitted through the PBCH such as system information blocks (SIBs), and paging messages.

The LTE standard includes two downlink synchronization signals that may be used by a user equipment (UE) to obtain the cell identity and frame timing. The two downlink synchronization signals are the primary synchronization signal (PSS) and the secondary synchronization signal (SSS). The LTE-SSS sequence alters every half a frame. For example, in the LTE standard, the LTE-SSS sequence alters every 5 ms. With some modifications to the LTE-SSS sequence's detection, the sequence detection may be combined over all of the LTE-SSS sequence's received bursts. For example, the LTE-SSS sequence's detection may be combined over all of the LTE-SSS sequence's received bursts using half-frame combining. As is discussed in greater detail below, LTE-SSS detection with half-frame combining may be performed using Fast Walsh-Hadamard Transforms (FWHTs). The FWHT may be an algorithm to compute the Walsh-Hadamard transform (WHT). The Hadamard transform may be an example of a generalized class of Fourier transforms.

In an example embodiment, LTE-SSS detection includes correlating two M-sequences. The two M-sequences may be length-31 M-sequences in one example. In other embodiments, other lengths are possible. The correlated two M-sequences may be combined. Each of the two correlations express the likelihood of the M-sequence's cyclic shift. Two cyclic shifts (m0 and m1) may be generated. Additionally, an N2-ID may be derived from the PSS. The two cyclic shifts (m0 and m1) together with the N2-ID derived from the PSS may give the SSS sequence N1-ID that would need to be detected for a possibly valid cell, e.g., not a non-existing or ghost cell.

To allow the combining every half a frame, some hypotheses are performed on the scrambling sequence of the second M-sequence. While the first M-sequence results in a high correlation for the correct cyclic shift, the other M-sequence results in a high correlation for the correct cyclic shift on one hypothesis. However, when the two correlations are combined, even on a false hypothesis the combined correlation may be relatively high since the first M-sequence contributes the first M-sequence's high correlation. Therefore, besides the true peak, some lower peaks may exist that may pass the detection threshold. A ghost cell may be referred to as a non-existing cell. A cell which is not a ghost cell may be referred to as a valid (or real) cell. The "ghost cells" filtering approach may use the knowledge of the signature that a specific SSS sequence has while going through the detection procedure. Additionally, the "ghost cells" filtering approach may aim to remove any peaks associated with a False-Alarm (FA), which may be referred to as False-Alarm peaks or FA peaks.

The conventional interference cancellation algorithm requires a two (or more) step process. In an example embodiment, the LTE-SSS "ghost cells" reduction using the signature approach may not require a two (or more) step process. For example, as described hereinafter, the false alarms arriving from LTE-SSS detection with half-frame combining may be identified by looking at the "signature" that a specific SSS sequence has while going through the detection procedure. Accordingly, identifying false alarms may, in some example embodiments, only include one additional step as part of going through the detection procedure, e.g., performing detection procedure and detecting the signature.

Additionally, the signature approach's only significant detection performance degradation may be observed on one radio channel, the Extended Typical Urban (ETU) radio channel. The performance degradation of the signature approach may only be observed on the ETU radio channel when the ETU radio channel is experiencing a moderate to low signal to noise ratio (SNR) in the inter-frequency case with a large power difference between the cells. Occurrences of an ETU radio channel having a moderate to low signal-to-noise ratio (SNR) in the inter-frequency case with a large power difference between the cells may be of less importance because the UE may not be expected to synchronize on such weak cells.

An embodiment may allow for LTE-SSS detection with half-frame combining without overloading the LTE communications system with constant false-alarms deriving from "ghost cells" and with negligible detection performance degradation. False alarms arriving from LTE-SSS detection with half-frame combining may be identified by looking at the "signature" that a specific SSS sequence has while going through the detection procedure. In an example embodiment, a method is provided to remove false alarms (e.g., "ghost cells") while still covering the case when there is a real cell that needs to be detected that shares the cyclic shifts.

FIG. 1 is a diagram illustrating joint maximum likelihood (ML) detection with half-frame combining 100. According to 3GPP specification [TS 36.211 section 6.11.2], the combination of two length-31 M-sequences defining the SSS differs between subframes (more specifically between the two halves of a frame) according to:

$$d(2n) = \begin{cases} s_0^{(m0)}(n)c_0(n) \text{ in first half frame} \\ s_1^{(m1)}(n)c_0(n) \text{ in second half frame} \end{cases}$$

$$d(2n+1) = \begin{cases} s_1^{(m1)}(n)c_1(n)z_1^{(m0)}(n) \text{ in first half frame} \\ s_0^{(m0)}(n)c_1(n)z_1^{(m1)}(n) \text{ in second half frame} \end{cases}$$

The mapping of the cell IDs to the cyclic shifts m0 and m1 of the two M-sequences that are combined together to give LTE-SSS may be done in such a manner that the first M-sequence $s_0^{(m0)}(n)$ (or $s_1^{(m1)}(n)$ depending on the half frame index) may be allocated in the even SCs and the second M-sequence $s_1^{(m1)}(n)$ (or $s_0^{(m0)}(n)$) may be allocated in the odd SCs. These two M-sequences are descrambled 102 by $c_0(n)$, $c_1(n)$, $z_1^{(m0)}(n)$ and $z_1^{(m1)}(n)$:

$c_0(n)$ and $c_1(n)$ are known after getting $N_{ID}^{(2)}$ from PSS detection.

Eight different scrambling sequences $z_1^{(m0)}(n)$ and eight different scrambling sequences $z_1^{(m1)}(n)$ 102 may exist.

LTE-SSS detection with half-frame combining may be performed using 1+8=9 Fast Walsh-Hadamard Transforms (FWHTs) 104. The first M-sequence $s_0^{(m0)}(n)$ (or $s_1^{(m1)}(n)$) undergoes a single FWHT to extract the correlation metrics for all m0 (or m1). There are eight more FWHTs 104 to cover all the options for the scrambling sequence $z_1^{(m0)}(n)$ (or $z_1^{(m1)}(n)$); for every scrambling sequence, the sequence after descrambling may be assumed as the second M-sequence $s_1^{(m1)}(n)$ (or $s_0^{(m0)}(n)$) and the sequence may undergo an FWHT 104 to give the correlation metrics for all m1 (or m0).

When using 9 FWHTs 104, the combined correlation metrics for the two M-sequences (notated hereafter as Generalized Log-Likelihood Ratios (GLLRs)) may be combined 110 in time every half frame, although an SSS sequence alternates every half a frame (for the first half m0 is detected by the first FWHT 104 and m1 is detected by the following 8 FWHTs, and vice versa for the second half) by swapping the two correlation buffers 108 every half frame. A schematic description is given in FIG. 1. The correlations may be buffered 108 prior to combining. Additionally, the combining 110 may use a toggle index and the sum of the subcarriers from block 106. The correlation metrics may be expressed as GLLRs.

The number of correlation metrics equal (1+8)*31 since there are two cyclic shifts, eight scrambling sequences, and 31 options for m0 or m1. However, only some combinations of (m0, m1) give a valid $N_{ID}^{(1)}$. Therefore, after combining the correlation metrics for every $N_{ID}^{(1)}$ and every half frame index, the number of correlation metrics may be reduced to $2*N_{sss-seq}=336$ GLLRs in one example embodiment.

The GLLRs may then be accumulated in space and time: over all Rx antenna ports and in SSS periodicity of 5 ms. The Generalized Log-Likelihood Ratio Test (GLLRT) may be done for each of the accumulated GLLRs, e.g., the GLLR may be compared to a threshold. In case of detection (e.g., GLLR>Threshold), the half-frame index may be extracted by Exclusive ORing (XORing) the buffer index with the current toggle index:

detectedHalfFrameIndex=buffIndex⊕toggleIndex

Figure 2:
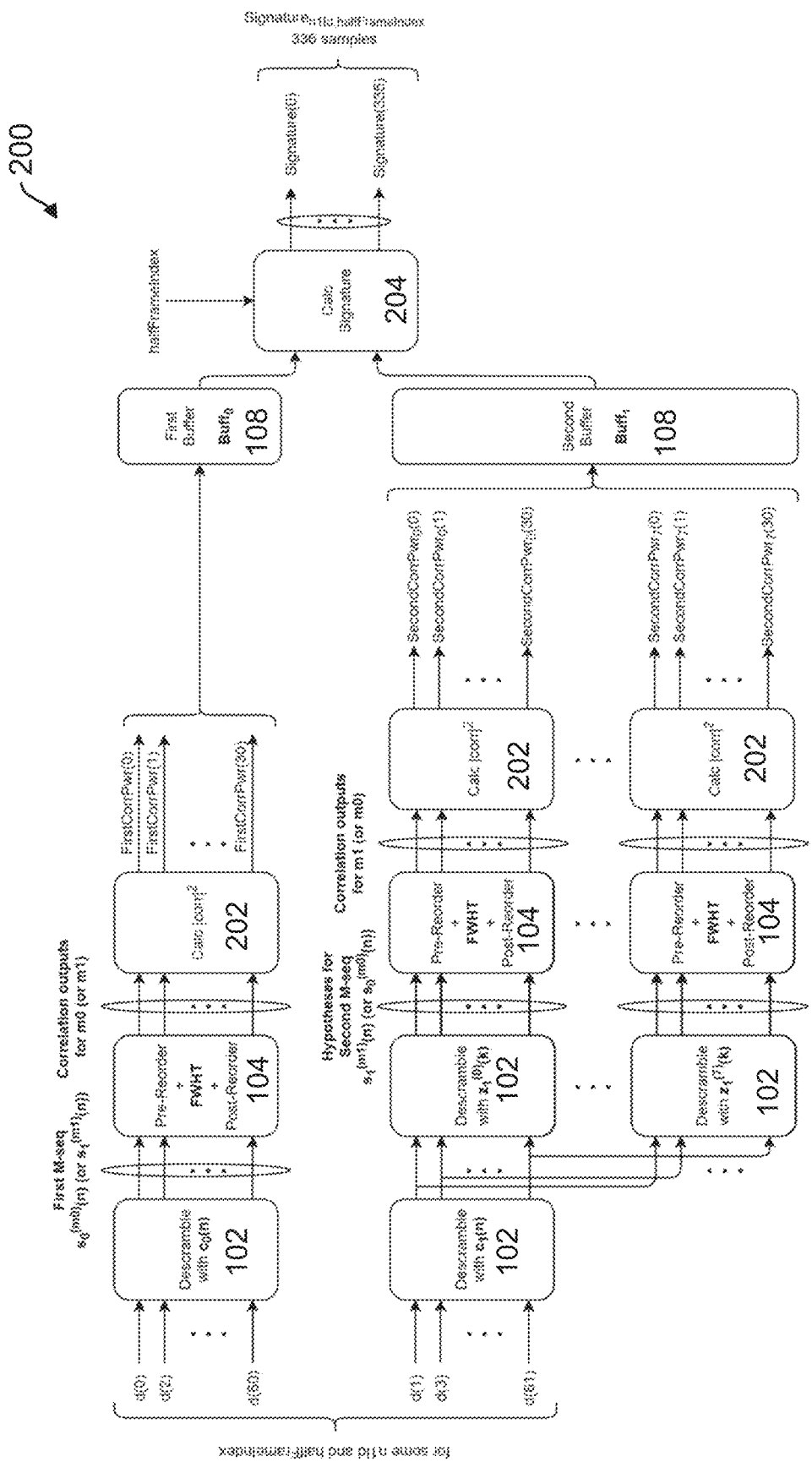
FIG. 2 is a diagram illustrating generating the "ghost cells" signatures.

False alarms from ghost cells may be identified. The signatures of all SSS sequences (per $N_{ID}^{(1)}$ and in the two halves of a frame) can be pre-calculated by the power of the correlation outputs for m0 and m1 as described in FIG. 2, combined from $Buff_0$ and $Buff_1$ to give the $2*N_{seq}$-length signature; where $N_{seq}=168$ is the number of $N_{ID}^{(1)}$'s FIG. 2 is a diagram illustrating generating the "ghost cells" signatures 200. Generating the "ghost cells" signatures may include descrambling 102, FWHT 104, and buffering 108, the same as or similar to the discussion with respect to FIG. 1. Generating the "ghost cells" signatures may also include calculating correlations 202 as described herein. Generating the "ghost cells" signatures may also include a signature calculation 204. A pseudo-code for calculating the signatures is as follows:

```
Function sssCalcSignature(n1Id, half FrameIndex):
    calc Buff₀ and Buff₀
    go over the two Buffers (buffIndex=0:1):
        go over all N1-IDs (otherN1Id=0: N seq-1):
            if buffIndex equals 0
                1stCS←m0
                2ndCS←m1
            else
                1stCS←m1
                2ndCS←m0
            if half FrameIndex equals 0
                corrSumPwr=Buff₀(1stCS)+Buff₁(1stCS  %8,
                    2ndCS)
            else
                corrSumPwr=Buff₀(2ndCS)+Buff₁(2ndCS  %8,
                    1stCS)
            Signature_{n1/Id,halfFrameIndex[otherN}1Id+
                buffIndex*N_{seq}]=corrSumPwr
```

In one example, the number of signatures to calculate equals $2*N_{seq}$ to cover all $N_{ID}^{(1)}$ in the two halves of a frame.

Figure 3:
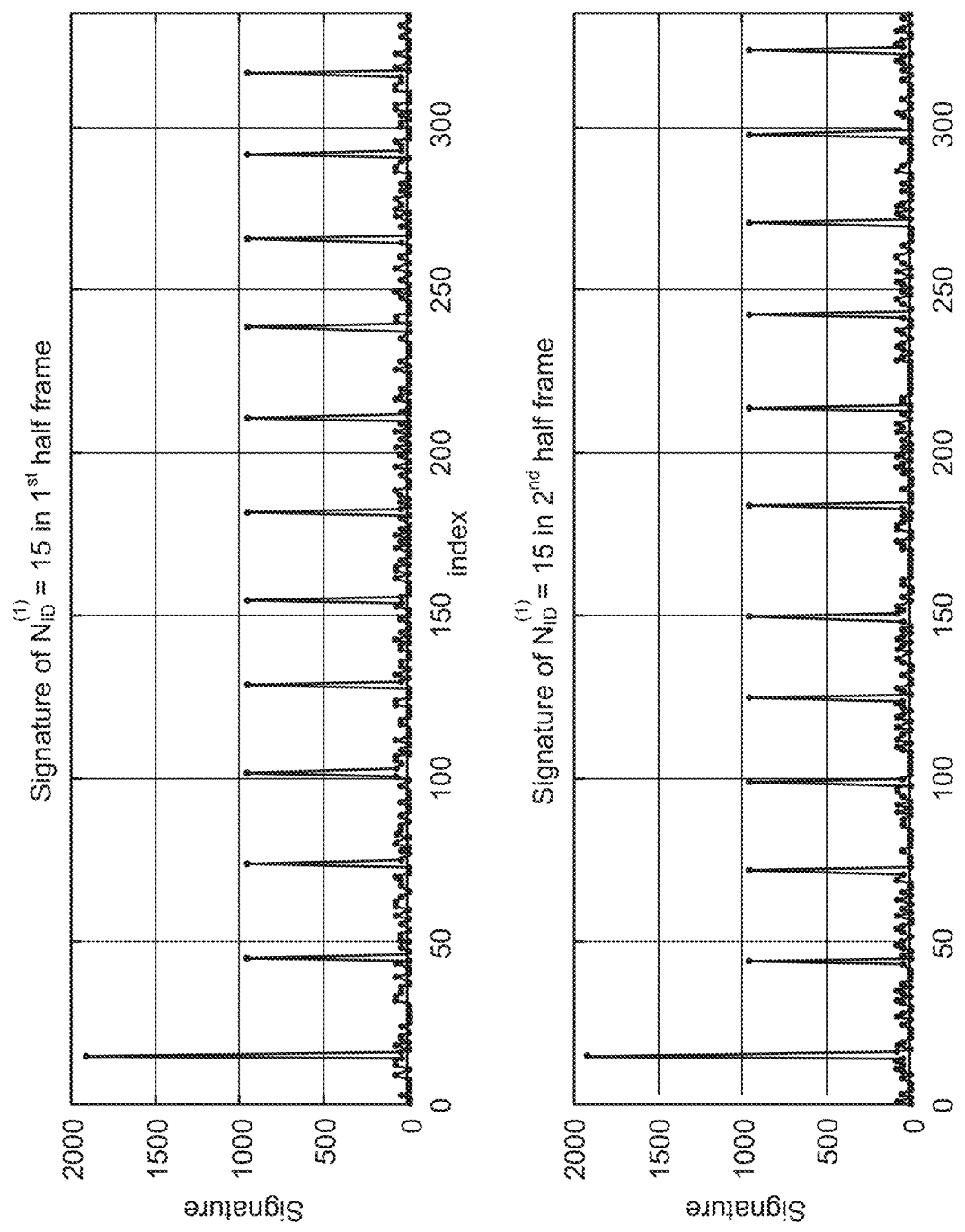
FIG. 3 is a diagram illustrating two signatures for $N_{ID}^{(1)}$=15 for two halves of a frame.

FIG. 3 is a diagram illustrating two signatures for $N_{ID}^{(1)}$= 15 for two halves of a frame. In order to get the signature of a detected SSS sequence $N_{ID}^{(1)}$ (and a detected half-frame index) after $M_{time}$ accumulations (in time) of the combined correlations' metrics, the following calculations should be taken. The number of accumulated first half frames and the number of accumulated second half frames may be calculated according to the detected half-frame index.

For example, for continuous-time scan:

numSecondHFs=⌊$M_{time}$/2⌋+($M_{time}$%2)*detectedHalf-FrameIndex numFirstHFs=$M_{time}$−numSecond-HalfFrame However, the modem UE may be required to support a discontinue time scan (e.g., for inter-frequency scan gaps), and thus the number of observed LTE-SSS parts in the useful signal should be counted according to toggleIndex and in granularity of 1 msec:

numSecondHFs=lteSssPartCnt(detectedHalfFrameIndex)

numFirstHFs=lteSssPartCnt(1−detectedHalfFrameIndex)

Where lteSssPartCnt(toggleIndex) holds the number of accumulations with toggleIndex of either 0 or 1 in a certain scan duration (e.g., 1 msec) out of the 5 msec period:

The signature may be a linear combination according to the number of observed LTE-SSS parts:

Signature=numFirstHFs*Signature$_{1stHF}$+numSecondHFs*Signature$_{2ndHF}$

The first and second halves of Signature are swapped when detectedHalfFrameIndex differs from toggleIndex (meaning that first detection started in the second half-frame). Finally, the signature's peak may be located at an index of:
combinedIndex=$N_{ID}^{(1)}$+(detectedHalfFrameIndex⊕toggleIndex)*$N_{seq}$ This signature may then be scaled according to the accumulated GLLR of the detected SSS sequence and subtracted from the $2N_{ID}^{(1)}$-length GLLRs' buffer:

$$scaleFactor = \alpha * \frac{AccGLLR}{Signature\ [combinedIndex]}$$

$$AccGLLRs = AccGLLRs - scaleFactor * Signature$$

In one example embodiment, a scaling factor with α=2/3 may take into account the worst-case scenario in which a neighbor cell may be as strong as the detected cell, one of the neighbor cell's ghost cells contributes to the detected cell true peak, and the neighbor cell's own true peak overlaps one of the ghost cells of the detected cell. It will be understood by those of skill in the art that scaling factors with α other than 2/3 may be used in other embodiments. For example, a scaling factor with α=1 may be used for aggressive self-ghost-cell filtering when only a single cell detection is relevant (in this example another valid cell sharing the same ghost cell ID might not be detected). In other example embodiments, scaling factors with α between 0 to 1 may be used.

Figure 4:
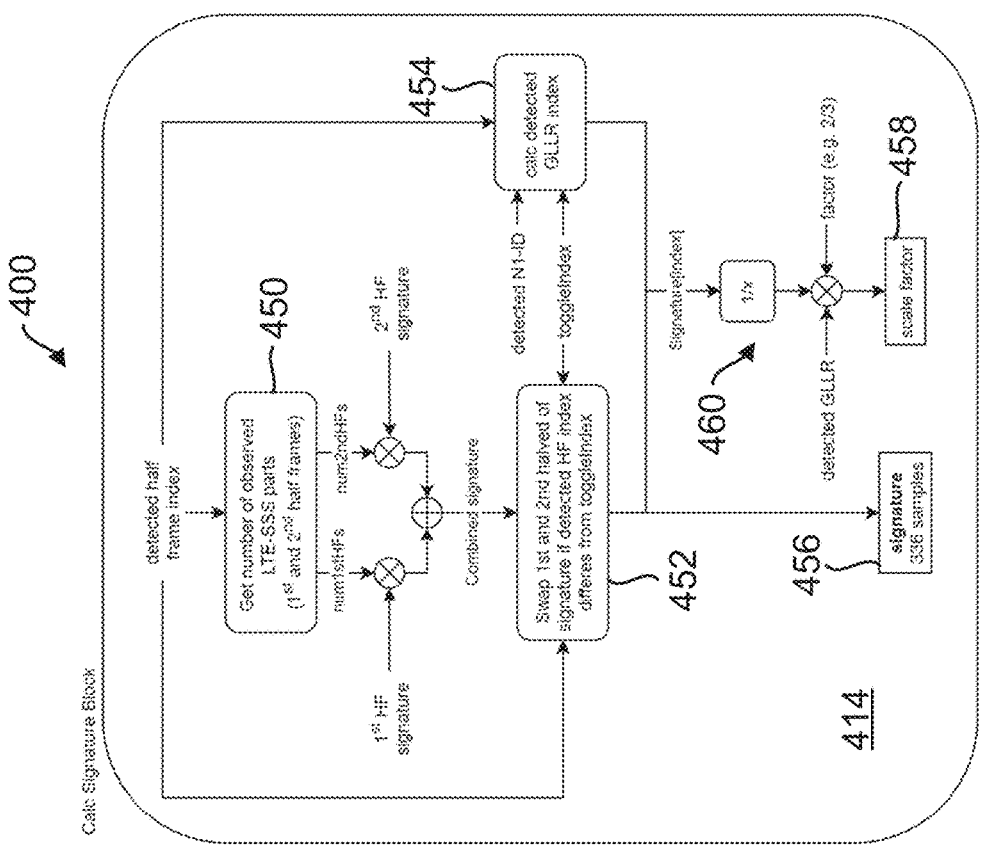
FIG. 4 is a diagram illustrating an SSS detection generalized likelihood ratio test (GLLRT) and "ghost cells" reduction.
Figure 4:
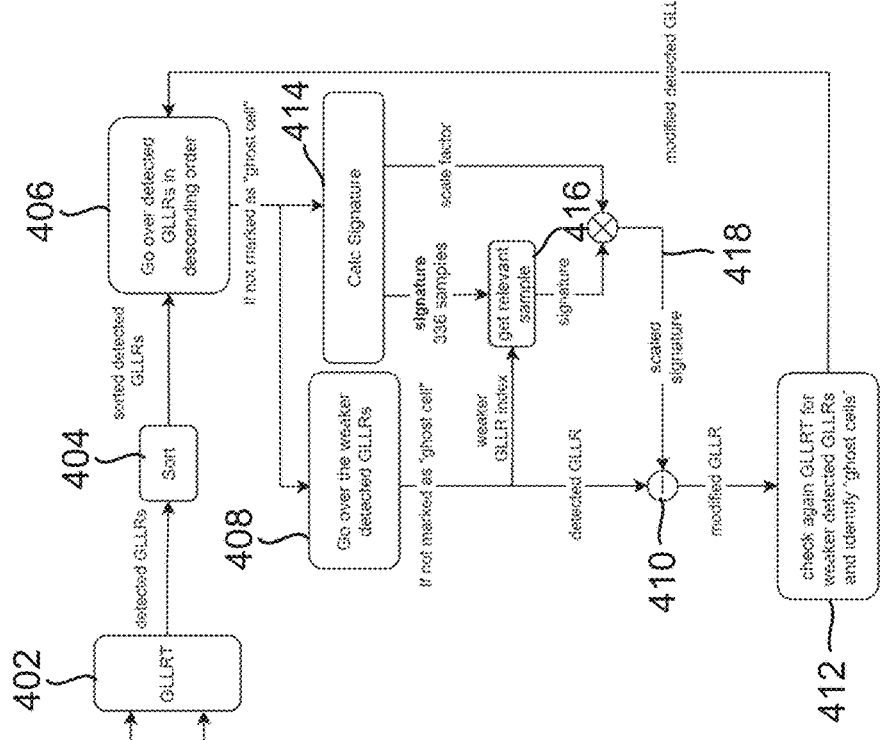

FIG. 4 is a diagram illustrating an SSS detection generalized likelihood ratio test (GLLRT) and "ghost cells" reduction 400. The "ghost cells" identification procedure depicted in FIG. 4 includes GLLRT detection 402. The detected GLLRT may be sorted 404 and gone over in descending order 406 to determine if any should be marked as a ghost cell. The weaker detected GLLRs may be processed 408. When the weaker detected GLLRs are not marked as ghost cells, the detected GLLR may be processed with a scaled signature 410 and then checked against GLLRT 412. The modified detected GLLRs from the check may be gone over again 406. The GLLRs may be used to calculate a signature. The signature samples and the weaker GLLR index may be processed to get a relevant sample 416. The signature and the scale factor may be combined 418 to generate a scaled signature. The calculate signature block 414 may be used to get a number of observed LTE-SSS parts 450, e.g., the first half-frame and second half frame. The first half frame and second half frames may be combined, and the combination may be swapped 452.

Additionally, a detected GLLR index may be calculated 454. The signature samples and the scaling factor 458 may be output 456. The scaling factor 458 may include the signature processed with the detected GLLR and a factor 460.

Figure 5:
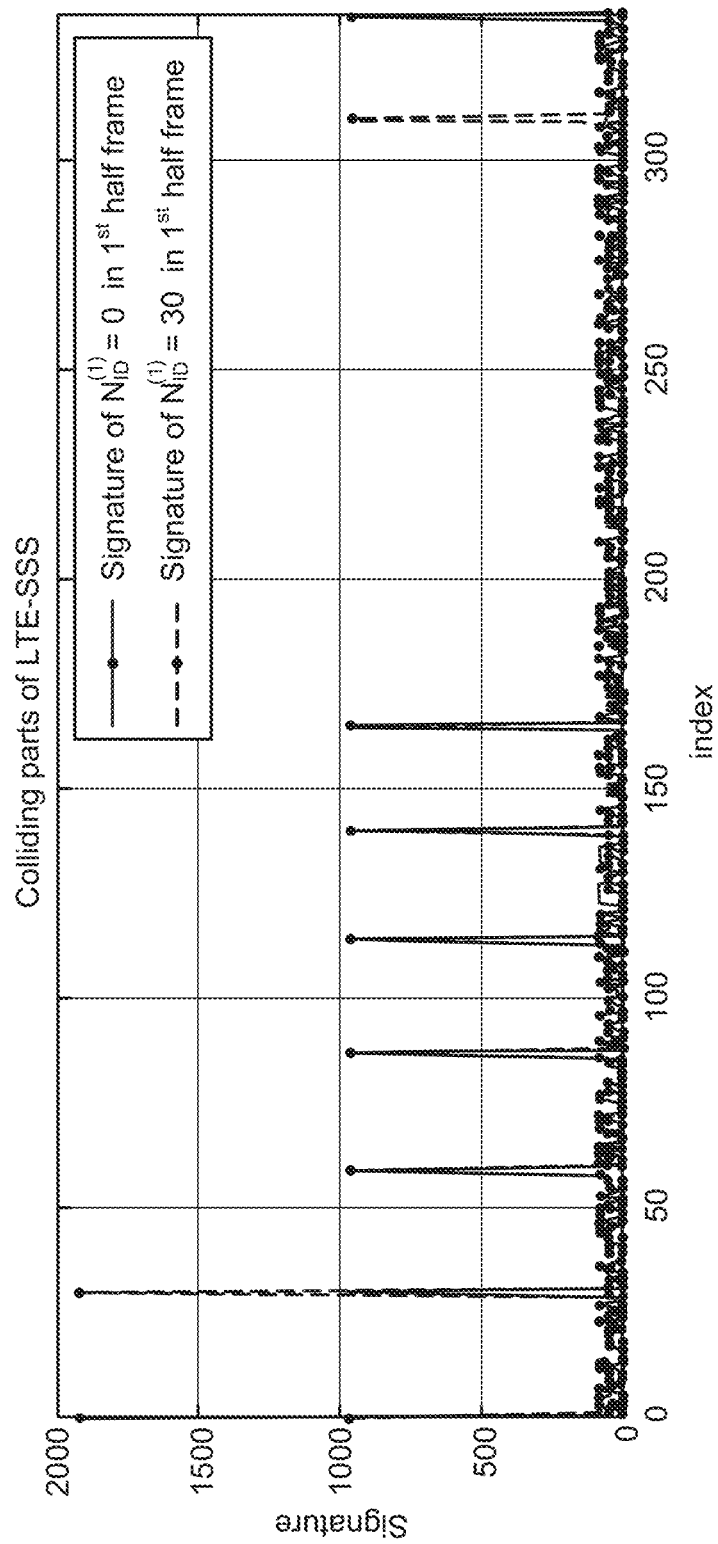
FIG. 5 is a diagram illustrating a worst-case scenario for SSS detection with "ghost cell" reduction $N_{ID}^{(1)}$=0 and 30.

FIG. 5 is a diagram illustrating a worst-case scenario for SSS detection with "ghost cell" reduction $N_{ID}^{(1)}$=0 and 30. For example, inter-frequency neighbor scan in connected mode: the UE will scan a neighbor frequency with a 40 ms periodicity during 6 ms, so the UE may always observe the same part of the SSS, as illustrated in FIG. 5 when the observed SSS in the one of SF0.

Finally, the generalized likelihood ratio may be tested again for each of the accumulated GLLRs of the other detected SSS sequences, whereas the "ghost cells" should not pass a detection threshold.

The procedure may be performed after sorting the accumulated GLLRs of all detected SSS sequences in descending order. A detected SSS sequence may only identify "ghost cells" on weaker detected sequences. In an example embodiment, only smaller accumulated GLLRs undergo the threshold test again.

The described method for reducing "ghost cell" false alarms may allow the detection of a real cell sharing those cyclic shifts since the method regularly subtracts the signature of every detected cell while keeping the contributions from other cells.

In an example, the maximal value in every one of the $2*N_{seq}$ pre-calculated signatures equal: $2*31^2$=1922 (since maximal |corr| equals 31 for the length-31 M-sequences $s_0^{(m0)}$ and $s_1^{(m1)}$) and all values are integers. Therefore 11 bits per sample may be enough, and there may be (2*

$N_{seq})^2$=112896 samples in one example. Therefore, without quantization, the memory size for all SSS signatures may equal 152 Kbytes in an example embodiment. However, performance degradation may be negligible with only 3 bits per sample, and thus the required memory size may be significantly reduced to 42 KBytes.

The worst-case scenario for SSS detection may involve a challenging use case. The challenging use case may be the inter-frequency neighbor scan in connected mode: here, the UE will scan a neighbor frequency with a 40 ms periodicity during 6 ms, so the UE may always observe the same part of the SSS; either subframe (SF) 0 or 5. To assess the degradation in neighbor detection, which may be introduced by the ghost cell filtering algorithm, the following configuration may be tested: a set of 2 cells (different $N_{ID}^{(1)}$, same $N_{ID}^{(2)}$) with the same m0 sequence, cell1 may have $N_{ID}^{(1)}$=0 and cell2 may have $N_{ID}^{(1)}$=30 in one example. The cells may be time-synchronized and frequency synchronized. The cells may also have no relative timing offset. The observed SSS may be the one of SF0.

Different relative power between the cells may be tested: cell2 at 0 dB, −4 dB, and −6 dB (relative to the cell1 power), with a different noise level (starting with a noise of 30 dB below cell 1, and up to 6 dB above cell1).

A second use case is in intra-frequency; now, both SSS parts (SF0 and SF5) may be observed. The same scenario as above may be used but with cell $N_{ID}^{(1)}$=117 and cell2 $N_{ID}^{(1)}$=91 and a 5 ms time offset between the cells, so the UE see the SSS of SF0 for cell1 and the one of SF5 for cell2 colliding (and vice versa). A fair comparison to evaluate the degradation introduced by the ghost cell filtering may be to compare the same scenario with a cell ID that does not have) any m0, m1, m0% 8, or m1% 8 in common (like $N_{ID}^{(1)}$=0 for cell 1 and $N_{ID}^{(1)}$=2 for cell 2). The simulation results may be with: M equals the total number of accumulation (in space and time). SNR refers to first cell and noise only; CINR includes both cells and noise.

Figure 6A:
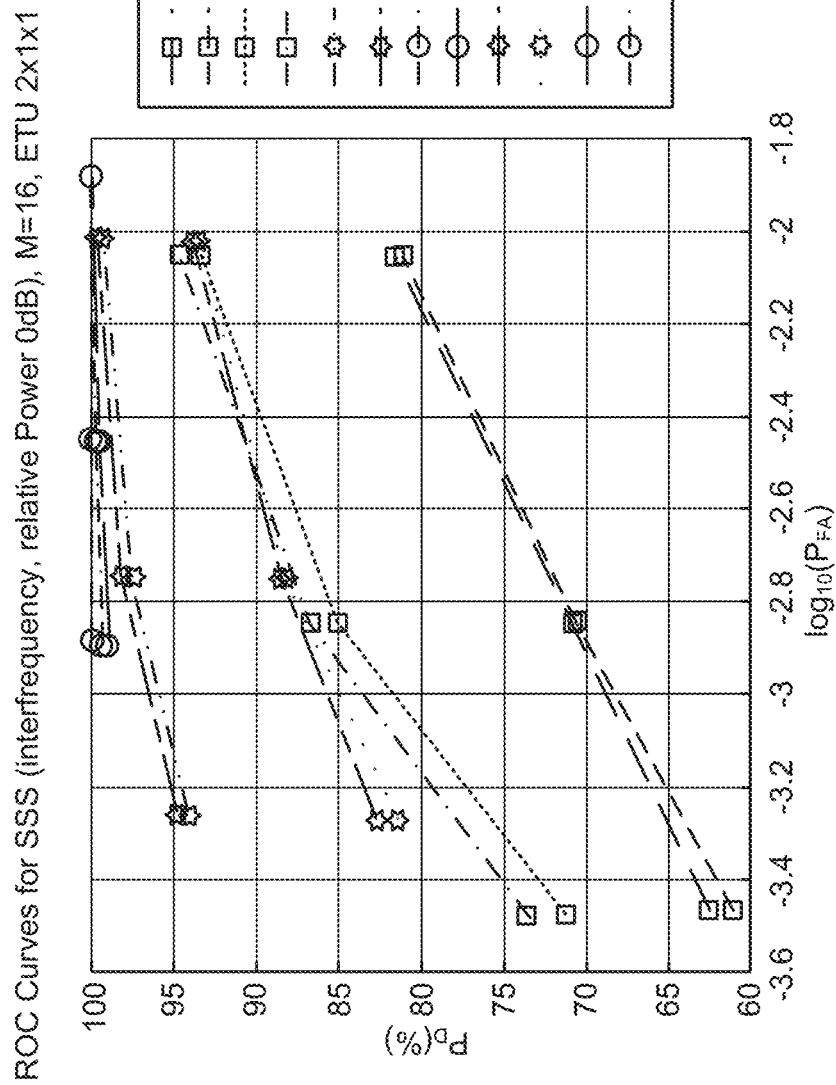
FIGS. 6A-6F are diagrams illustrating inter-frequency neighbor scans with no relative timing offset.
Figure 6B:
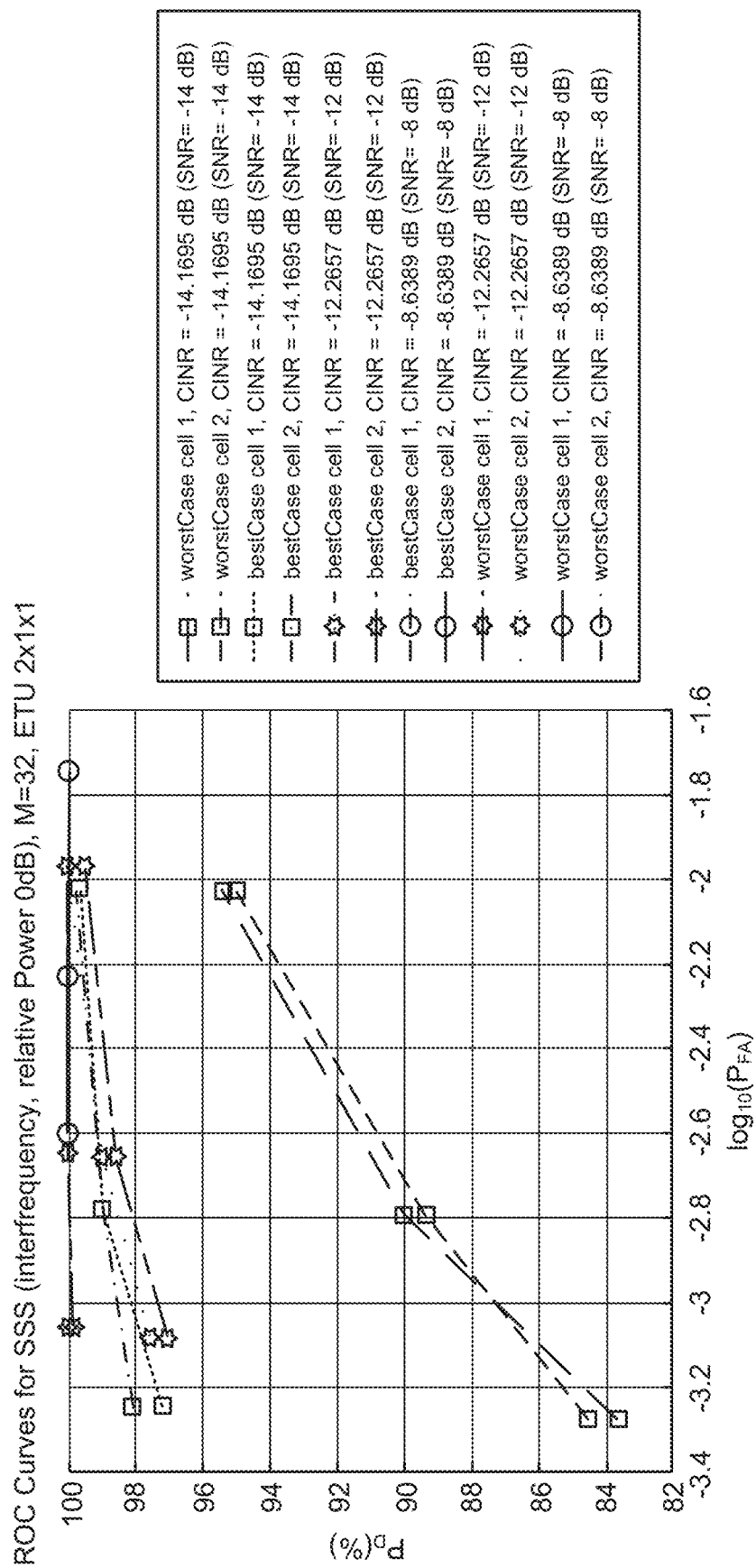
Figure 6C:
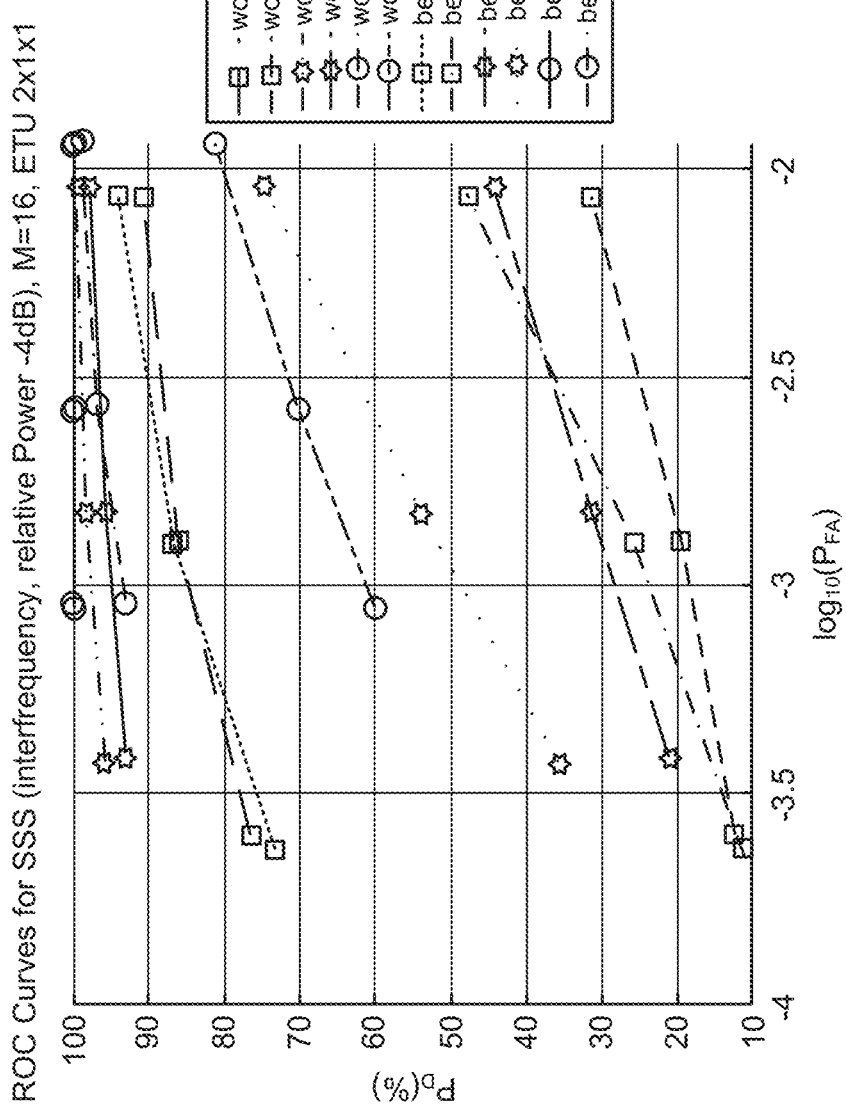
Figure 6D:
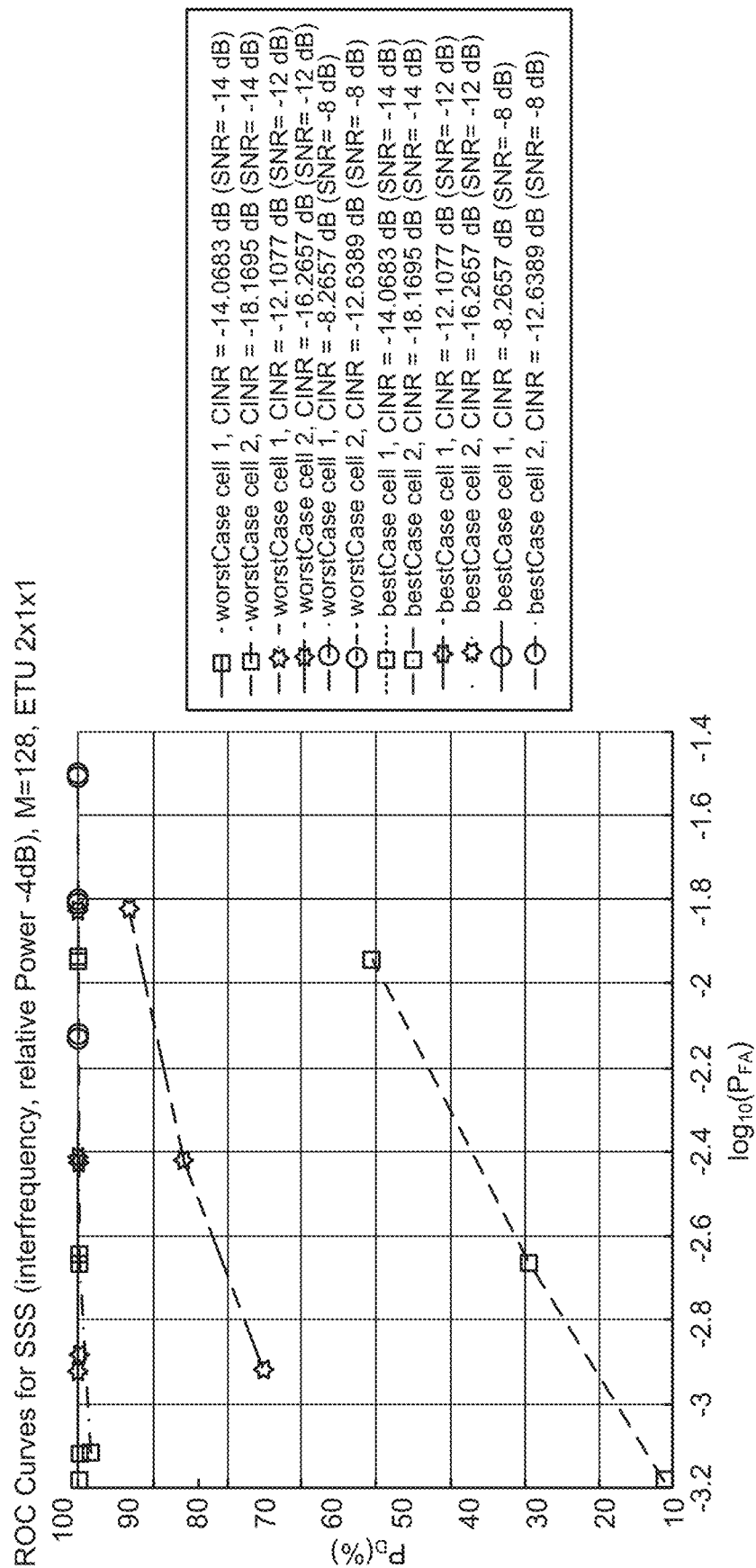
Figure 6E:
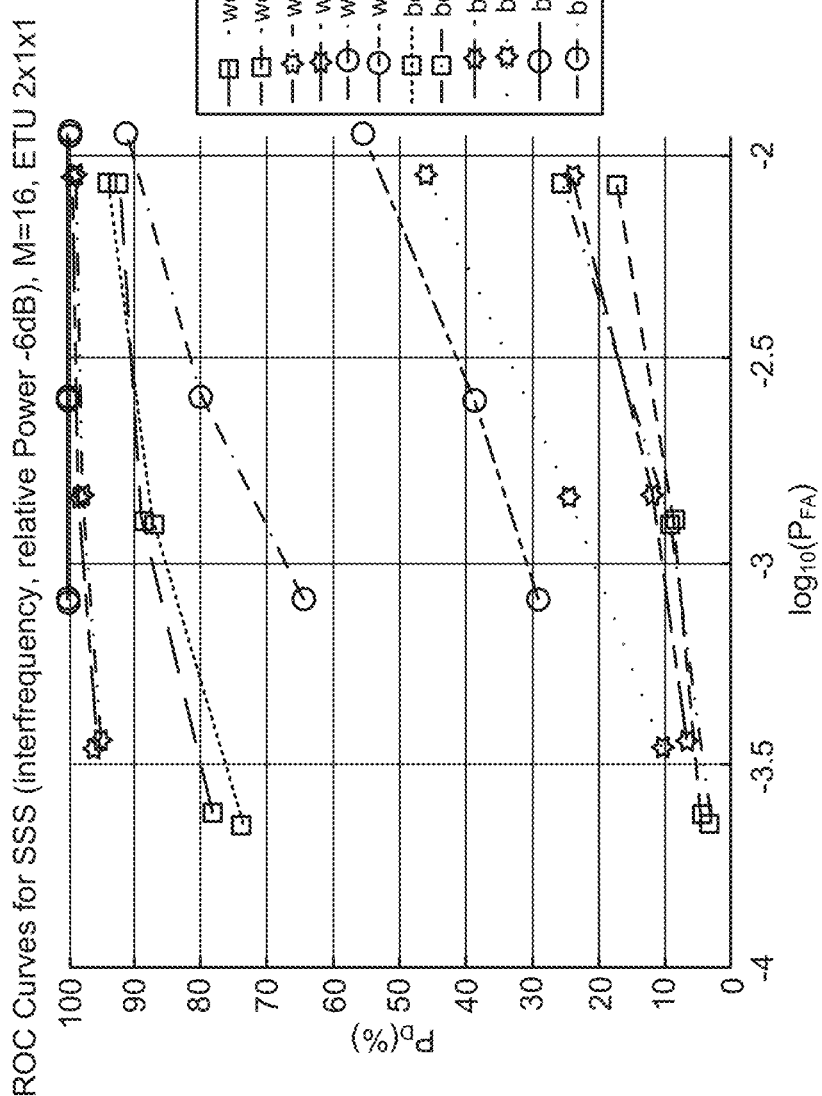
Figure 6F:
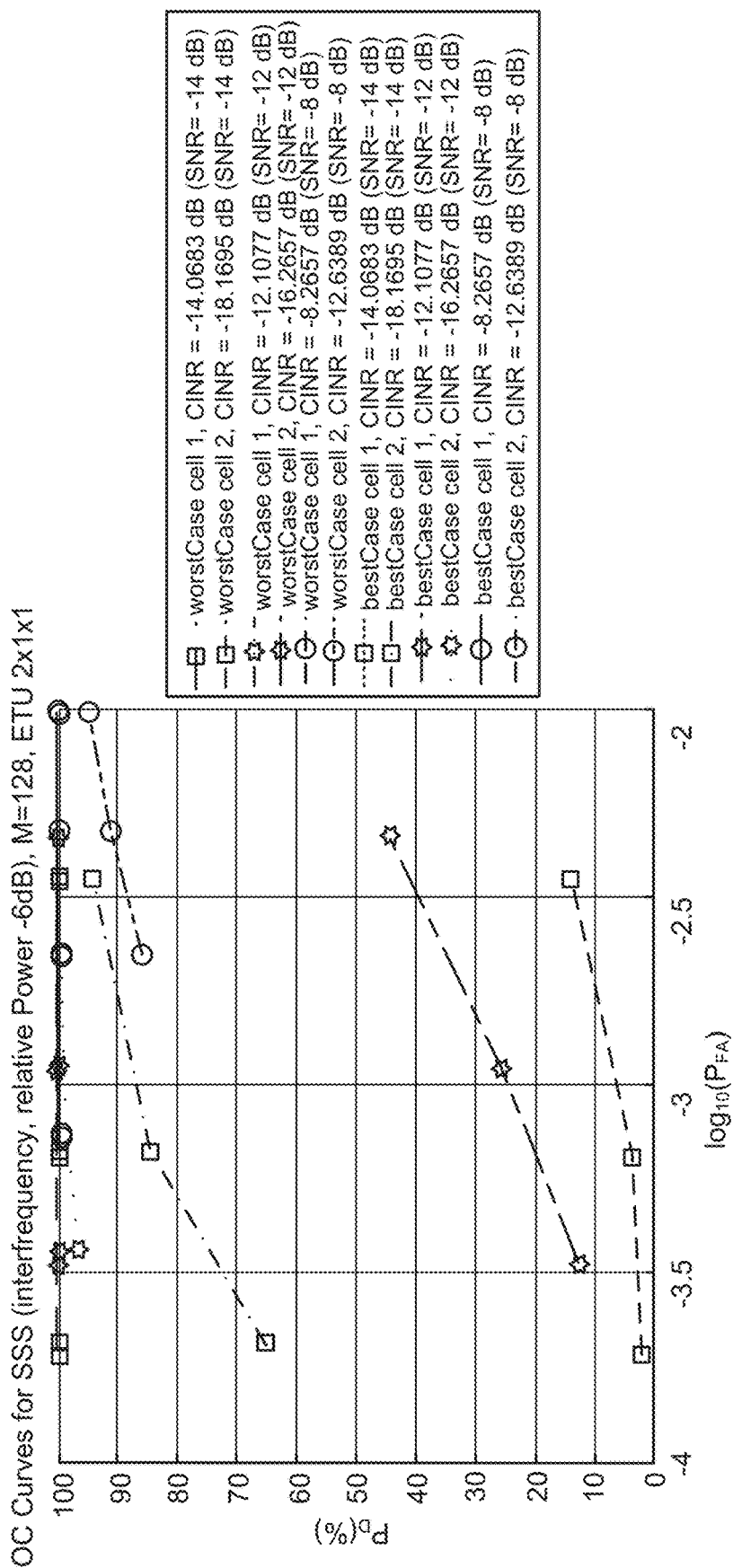

FIGS. 6A-6F are diagrams illustrating inter-frequency neighbor scans with no relative timing offset—for example, FIG. 6A illustrates Receiver Operating Characteristics (ROC) curves for SSS with an inter-frequency and a relative power of 0 dB and with M=16, ETU 2×1×1. FIG. 6B illustrates ROC curves for SSS with an inter-frequency relative power of 0 dB and with M=32, ETU 2×1×1. FIG. 6C illustrates ROC curves for SSS with an inter-frequency and with relative power of −4 dB and with M=16, ETU 2×1×1. FIG. 6D illustrates ROC curves for SSS with an inter-frequency and with a relative power of −4 dB and with M=128, ETU 2×1×1. FIG. 6E illustrates ROC curves for SSS with an inter-frequency and with a relative power of −6 dB and with M=16, ETU 2×1×1. FIG. 6F illustrates ROC curves for SSS with an inter-frequency and with a relative power of −6 dB and with M=128, ETU 2×1×1.

Figure 7A:
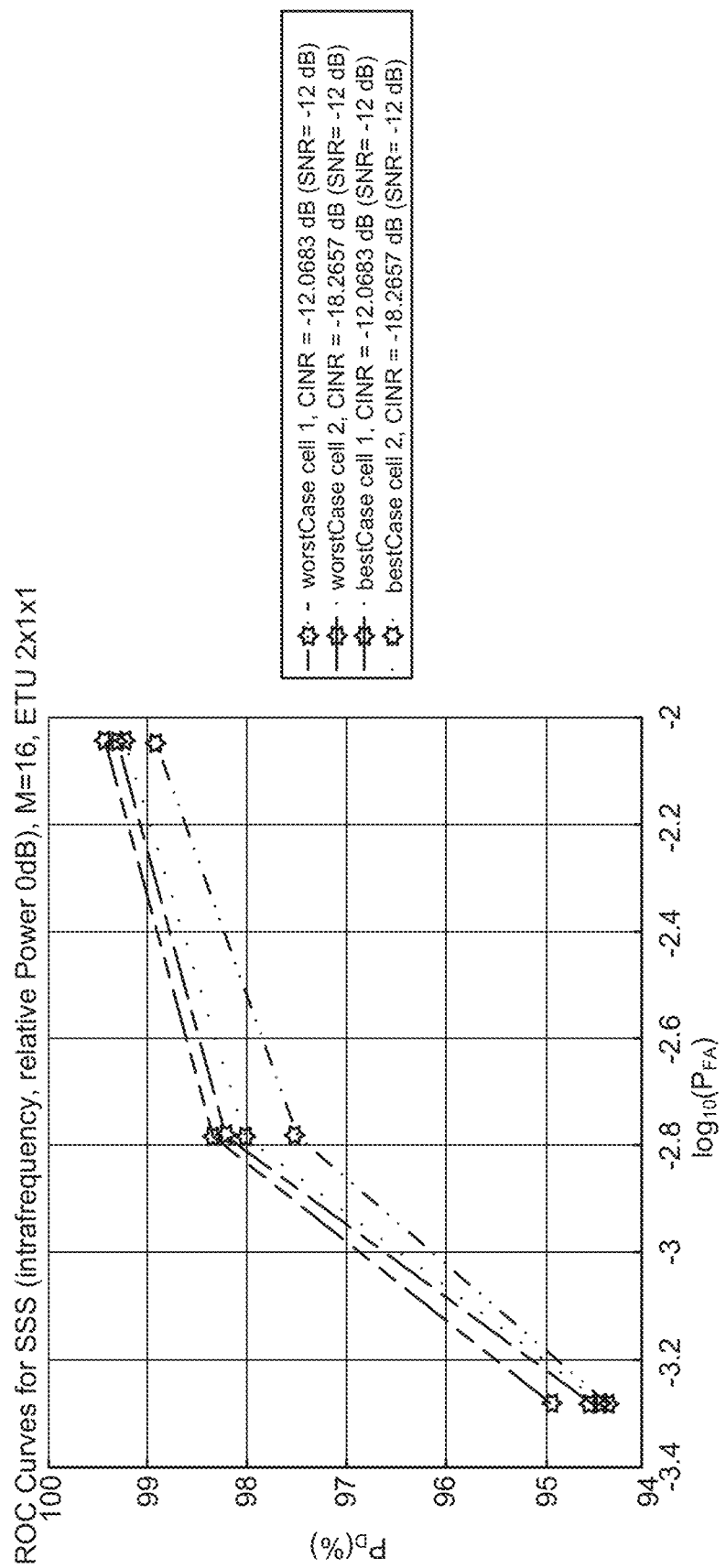
FIGS. 7A-7D are diagrams illustrating intra-frequency with 5 ms time offset between the cells.
Figure 7B:
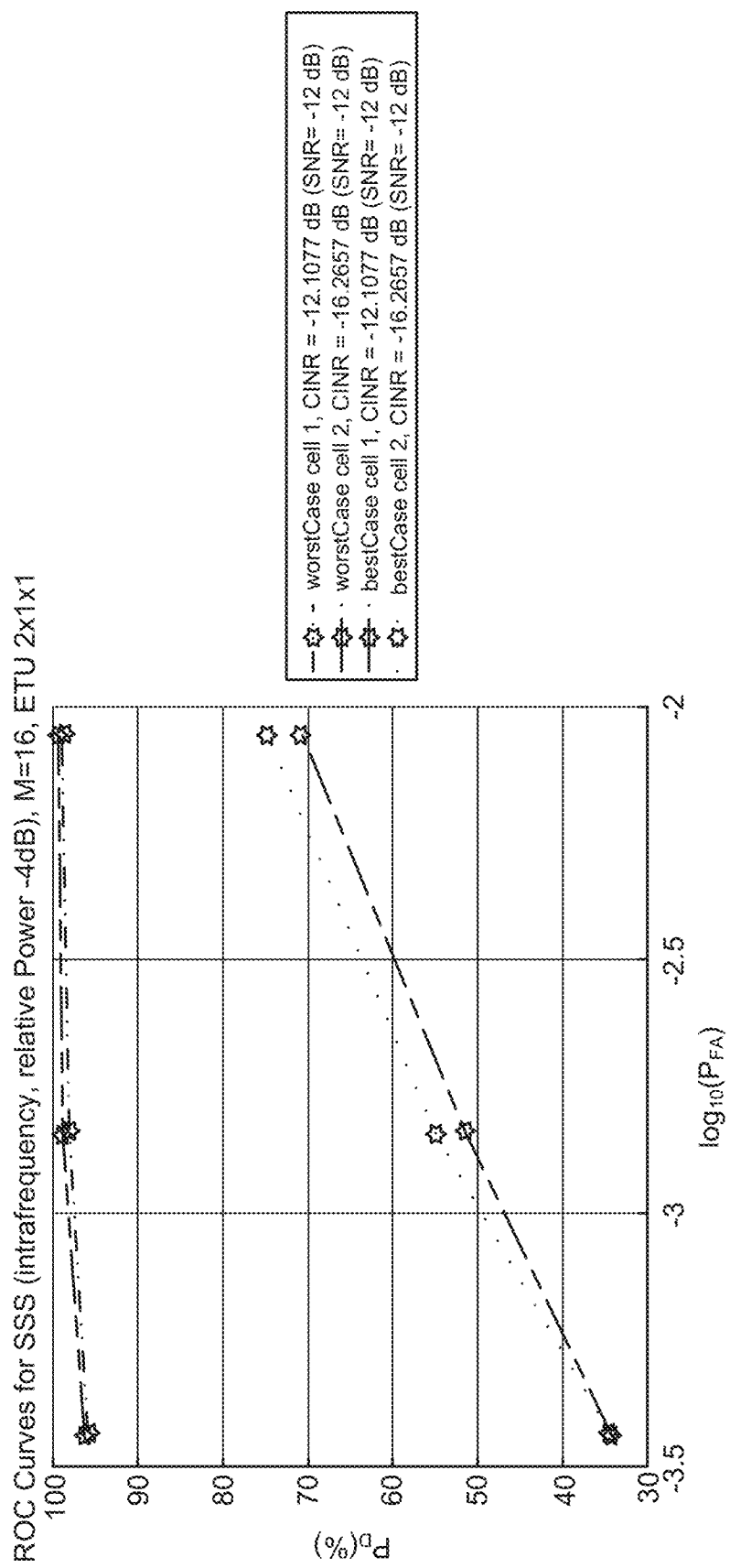
Figure 7C:
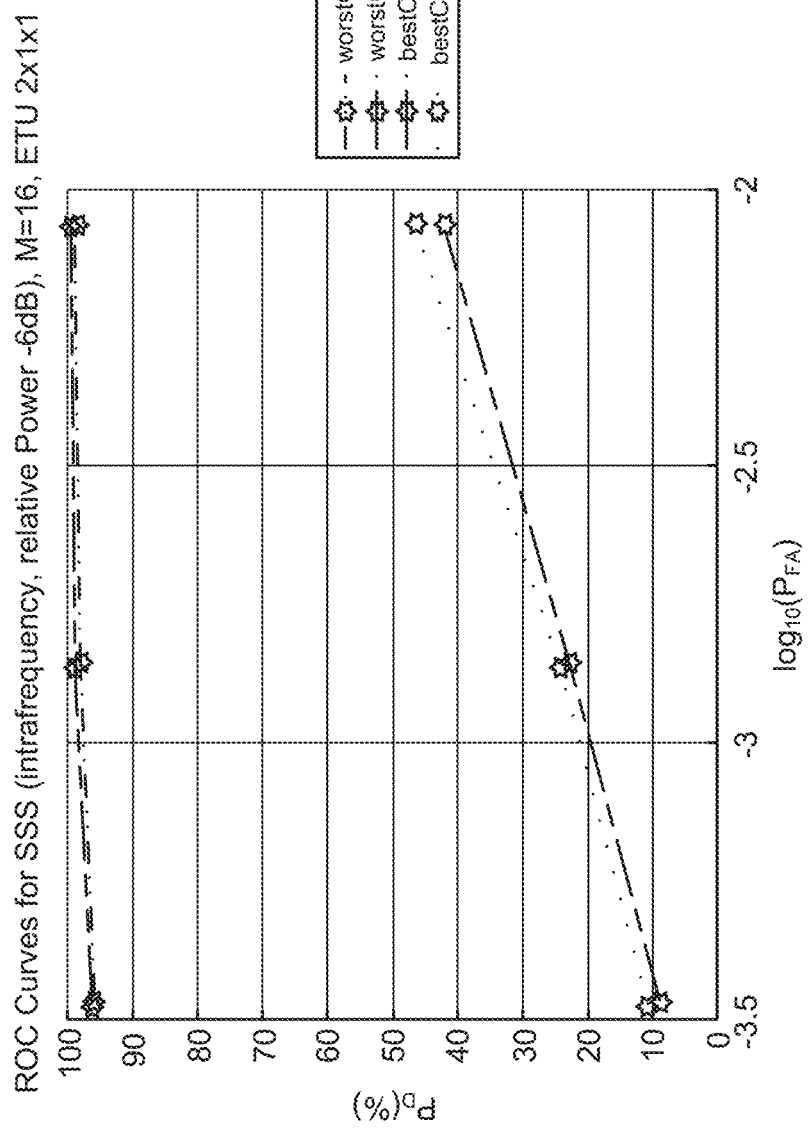
Figure 7D:
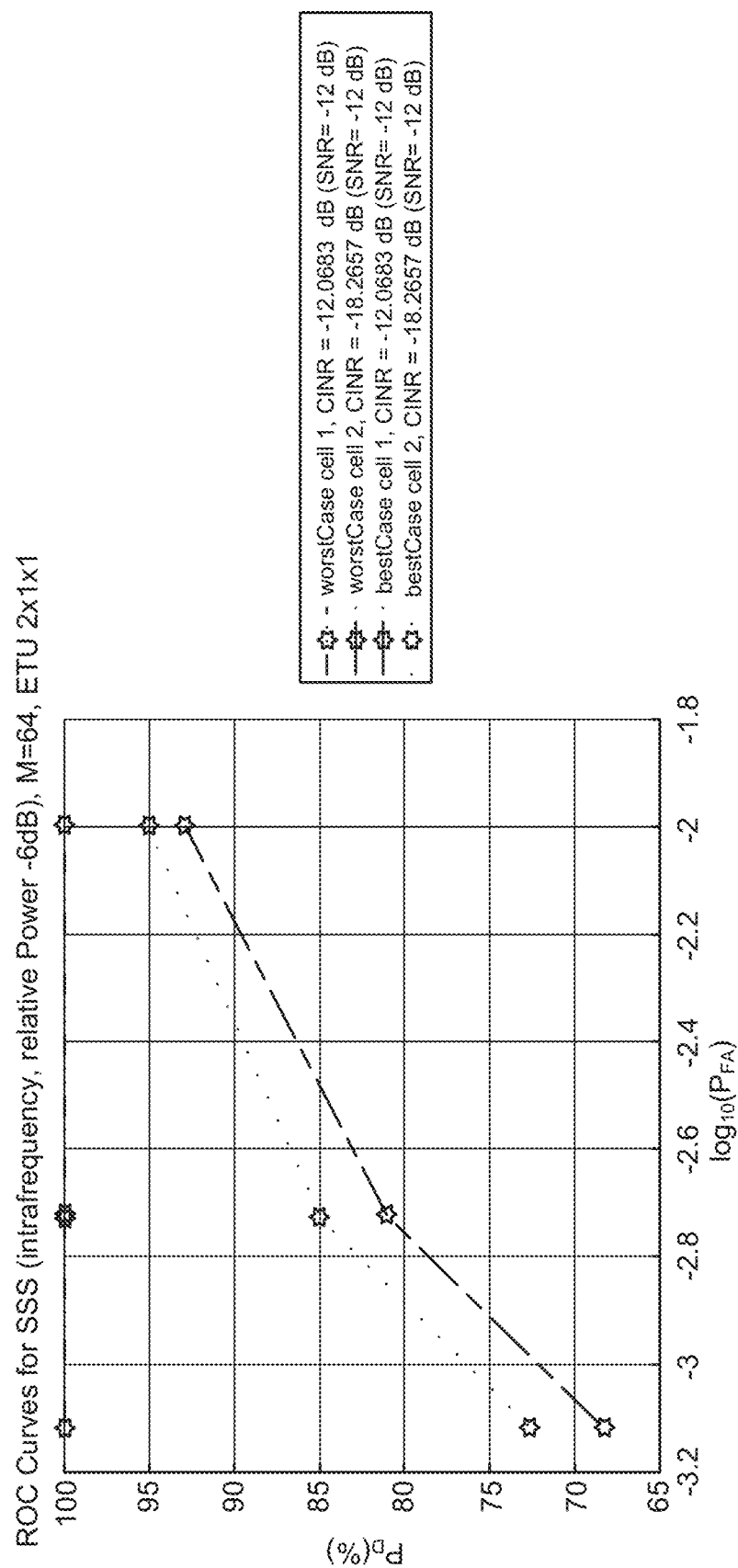

FIGS. 7A-7D are diagrams illustrating intra-frequency with a 5 ms time offset between the cells. The figures are diagrams illustrating inter-frequency neighbor scans with no relative timing offset—for example, FIG. 7A illustrates ROC curves for SSS with an inter-frequency and a relative power of 0 dB and with M=16, ETU 2×1×1. FIG. 7B illustrates ROC curves for SSS with an inter-frequency and a relative power of −4 dB and with M=16, ETU 2×1×1. FIG. 7C illustrates ROC curves for SSS with an inter-frequency and with a relative power of −6 dB and with M=16, ETU 2×1×1. FIG. 7D illustrates ROC curves for SSS with an inter-frequency and with a relative power of −6 dB and with M=64, ETU 2×1×1.

In an example, the only significant detection performance degradation occurs with moderate to low SNR in the inter-frequency case with a large power difference between the cells.

An example embodiment allows the LTE-SSS detection with half-frame combining without overloading the system with constant false-alarms deriving from "ghost cells" and with negligible detection performance degradation.

An example embodiment may allow an accumulated buffer of correlation metrics to be directly used as soon as cells are detected to eliminate their "ghost-cells", therefore speeding up the detection of weaker cells. The cancellation does not involve multiple detections and channel estimations. Moreover, there may be no real limitation on the number of cells to detect.

FIG. 8 is a flow diagram illustrating an example method 800 in accordance with the systems and methods described herein. The method includes performing a detection procedure in the mobile communications network 802. The detection procedure includes correlating two M-sequences to generate two correlations and combining the two correlations. Each correlation may be expressed as a likelihood of a cyclic shift, combining the two correlations to form a likelihood of a SSS sequence.

The method also includes hypothesis testing on a scrambling sequence of a second M-sequence of the two M-sequences to combine the two correlations in each of the half-frames (804).

The method further includes performing a signature-based filtering to eliminate a cell detection false alarm peak (806). The signature-based filtering may include comparing a known signature of a SSS sequence going through the detection procedure.

In an aspect, the likelihood of a cyclic shift includes a likelihood of the M-sequence's cyclic shift.

The two cyclic shifts, together with N2-ID, may be used to generate the specific SSS sequence first identifier (N1-ID) that needs to be detected.

In an aspect, a first M-sequence of the two M-sequences undergoes a single Fast Walsh-Hadamard Transform (FWHT), the FWHT of the first M-sequence extracting correlation metrics of one of the two cyclic shifts.

In an aspect, a second M-sequence of the two M-sequences undergoes eight Fast Walsh-Hadamard Transforms (FWHTs), the FWHTs of the second M-sequence further extracting correlation metrics of another of the two cyclic shifts.

In an aspect, a signature for a SSS sequence may be pre-calculated by using the power of the correlation outputs, the signatures used in the signature-based filtering.

One or more of the components, steps, features, and/or functions illustrated in the figures may be rearranged and/or combined into a single component, block, feature or function or embodied in several components, steps, or functions. Additional elements, components, steps, and/or functions may also be added without departing from the disclosure. The apparatus, devices, and/or components illustrated in the Figures may be configured to perform one or more of the methods, features, or steps described in the Figures. The algorithms described herein may also be efficiently implemented in software and/or embedded in hardware.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the methods used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared or otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following disclosure, it is appreciated that throughout the disclosure terms such as "processing," "computing," "calculating," "determining," "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. It will be appreciated that a variety of programming languages may be used to implement the teachings of the invention as described herein.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats.

Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming.

Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for cell detection in a mobile communications network, the method comprising:
   performing a detection procedure in the mobile communications network, the detection procedure including correlating two M-sequences to generate two correlations, and combining the two correlations, each correlation expressed as a likelihood of a cyclic shift, combining the two correlations to form a likelihood of a SSS sequence; and
   performing a signature-based filtering to eliminate a cell detection false alarm peak, the signature-based filtering including comparing a known signature of a specific secondary synchronization signal (SSS) sequence going through the detection procedure.

2. The method of claim 1, wherein the likelihood of a cyclic shift comprises a likelihood of the M-sequence's cyclic shift.

3. The method of claim 2, wherein the two cyclic shifts and a second identification (N2-ID) derived from a primary synchronization signal (PSS) are used to generate the specific SSS sequence first identifier (N1-ID) that needs to be detected.

4. The method of claim 1, further comprising a hypothesis test performed on a scrambling sequence of a second M-sequence of the two M-sequences to combine the two correlations in each of the half frames.

5. The method of claim 1, wherein a first M-sequence of the two M-sequences undergoes a single Fast Walsh-Hadamard Transform (FWHT), the single FWHT of the first M-sequence extracting correlation metrics of one of the two correlations.

6. The method of claim 5, wherein a second M-sequence of the two M-sequences undergoes eight Fast Walsh-Hadamard Transforms (FWHTs), the FWHTs of the second M-sequence further extracting correlation metrics of another of the two cyclic shifts.

7. The method of claim 1, wherein signatures for a SSS sequence is pre-calculated by using power of the correlation outputs, the signatures used in the signature-based filtering.

8. An apparatus for wireless communication, the apparatus comprising:
   a memory; and
   at least one processor coupled to the memory and configured to:
     perform a detection procedure in the mobile communications network, the detection procedure including correlating two M-sequences to generate two correlations, and combining the two correlations, each correlation expressed as a likelihood of a cyclic shift, combining the two correlations to form a likelihood of a SSS sequence; and
     perform a signature-based filtering to eliminate a cell detection false alarm peak, the signature-based filtering including comparing a known signature of a specific secondary synchronization signal (SSS) sequence going through the detection procedure.

9. The apparatus of claim 8, wherein the likelihood of a cyclic shift comprises a likelihood of the M-sequence's cyclic shift.

10. The apparatus of claim 9, wherein the two cyclic shifts and a second identification (N2-ID) derived from a primary synchronization signal (PSS) are used to generate the specific SSS sequence first identifier (N1-ID) that needs to be detected.

11. The apparatus of claim 8, further comprising a hypothesis test performed on a scrambling sequence of a second M-sequence of the two M-sequences to combine the two correlations in each of two half frames.

12. The apparatus of claim 8, wherein a first M-sequence of the two M-sequences undergoes a single Fast Walsh-Hadamard Transform (FWHT), the FWHT of the first M-sequence extracting correlation metrics of the two correlations.

13. The apparatus of claim 8, wherein signatures for a SSS sequence is pre-calculated.

14. The apparatus of claim 13, wherein the pre-calculating uses a power of the correlation outputs and the signatures used in the signature-based filtering.

15. A non-transitory computer-readable medium storing computer executable code for wireless communication, the code when executed by a processor causing the processor to:
   perform a detection procedure in the mobile communications network, the detection procedure including correlating two M-sequences to generate two correlations, and combining the two correlations, each correlation expressed as a likelihood of a cyclic shift, combining the two correlations to form a likelihood of a SSS sequence; and
   perform a signature-based filtering to eliminate a cell detection false alarm peak, the signature-based filtering including comparing a known signature of a specific secondary synchronization signal (SSS) sequence going through the detection procedure.

16. The non-transitory computer-readable medium of claim 15, wherein the likelihood of a cyclic shift comprises a likelihood of the M-sequence's cyclic shift.

17. The non-transitory computer-readable medium of claim 16, wherein the two cyclic shifts and a second identification (N2-ID) derived from a primary synchronization signal (PSS) are used to generate the specific SSS sequence first identifier (N1-ID) that needs to be detected.

18. The non-transitory computer-readable medium of claim 15, further comprising a hypothesis test performed on a scrambling sequence of a second M-sequence of the two M-sequences to combine each of two half frames to combine the two correlations.

19. The non-transitory computer-readable medium of claim 15, wherein a first M-sequence of the two M-sequences undergoes a single Fast Walsh-Hadamard Transform (FWHT), the FWHT of the first M-sequence extracting correlation metrics of the one of the two cyclic shifts.

20. The non-transitory computer-readable medium of claim 15, wherein a second M-sequence of the two M-sequences undergoes eight Fast Walsh-Hadamard Transforms (FWHTs), the FWHTs of the second M-sequence further extracting correlation metrics of another of the two cyclic shifts.

* * * * *